May 20, 1941.  R. E. MARBURY  2,242,362
ELECTRIC WATER HEATER SYSTEM
Filed July 27, 1939
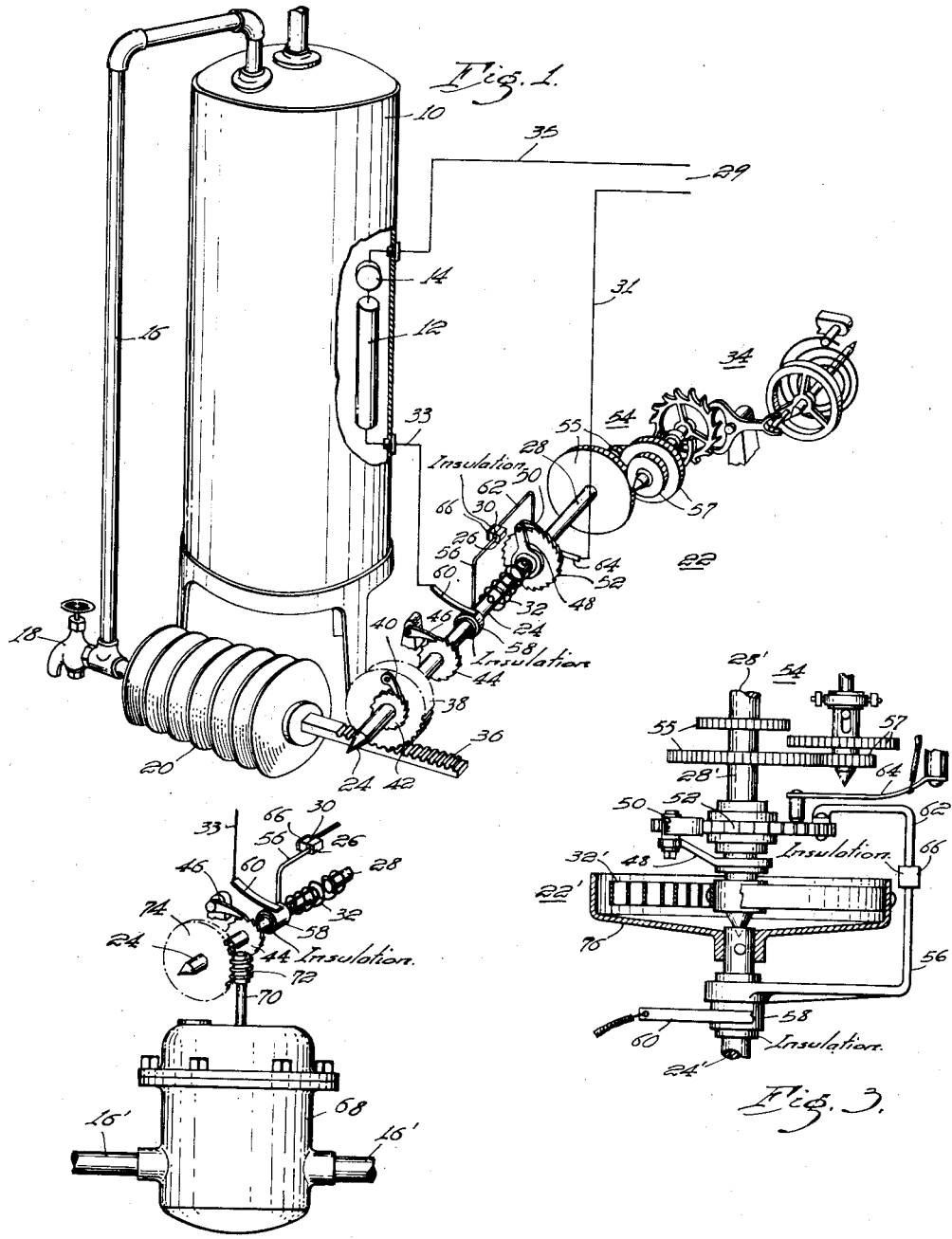
WITNESSES:
INVENTOR
Ralph E. Marbury
BY
ATTORNEY Patented May 20, 1941

2,242,362

UNITED STATES PATENT OFFICE 2,242,362

ELECTRIC WATER HEATER SYSTEM

Ralph E. Marbury, Wilkinsburg, Pa., assignor to Westinghouse Electric & Manufacturing Company, East Pittsburgh, Pa., a corporation of Pennsylvania Application July 27, 1939, Serial No. 286,829

8 Claims. (Cl. 219—39)

My invention relates to water heaters, and the like, and more particularly to a water heating control system.

An object of my invention is to provide a water heating control system which includes means responsive to the water usage for regulating the operation of the water heater.

Another object of my invention is to provide a fluid heating control system for a fluid container which includes means responsive to the change in the tank pressure of such fluid upon the use thereof or means responsive to the volume of fluid passing from such container for regulating the operation of the fluid heater.

A further object of my invention is to provide a fluid heating control system which includes means responsive to fluid usage for preventing the application of heat, and cooperative means responsive to the passage of time for rendering the heat-imparting means effective after a predetermined period of time after such usage.

A still further object of my invention is to provide a fluid heating control system for a fluid container having a heating element located therein, which system is organized to prevent the energization of such element for a predetermined period of time after each withdrawal of fluid from such container or upon the withdrawal of a given amount of fluid from the container and which is organized to accumulate the deenergization period for each successive withdrawal of fluid from the container for preventing the energization of the heater during heavy periods of power consumption by other devices in the same household, for example.

Another object of my invention is to provide a fluid or water heating control system for a fluid or water container having a heating element associated therewith, which system is organized to prevent the energization of the container heater for a predetermined time after the last water usage.

Still another object of my invention is to provide a fluid or water heating control system for a fluid or water container having heating means associated therewith, which system is organized to prevent the energization of the container heating means for an accumulative period of time depending upon the number or quantity of fluid withdrawals and for a predetermined period of time after the last withdrawal, before reenergization of the heating means.

Still another object of my invention is to provide a control system which is adapted to measure power taken from a storage system such as a fluid heating container, air beacon storage battery, or the like, so as to determine the amount of replenishment required and to control the amount of replenishing power returned to the storage system.

Other objects of my invention will either be pointed out specifically in the course of the following description of a device embodying my invention, or will be apparent from such description.

In the accompanying drawing,

Figure 1 is an exploded perspective view illustrating a control system associated with a fluid tank embodying my invention, Fig. 2 illustrates a modified form of means responsive to the usage for actuating the control system shown in Fig. 1, and Fig. 3 is a view illustrating a modified form of a portion of the control mechanism shown in Fig. 1.

Referring to the accompanying drawing, I show a fluid heating control system including a fluid container or tank 10 having a heating unit 12 located therein, a thermostat 14 for operating the unit 12 in a well known manner, an outlet pipe 16 and spigot 18 associated therewith, and a bellows or diaphragm 20 associated with the outlet pipe and with a control mechanism 22. The control mechanism comprises a driven shaft 24 and contactor 26, a following shaft 28 and cooperating contactor 30 operatively associated with the driven shaft 24 and contactor 26 through a resilient member 32, and a self-starting escapement mechanism 34 which limits the rotating velocity of the following shaft 28 and contactor 30.

The bellows 20, formed in any well known manner, is associated with the outlet pipe 16 and spigot 18 at one end to receive fluid therein and has a rack 36 attached to and mounted in a horizontal position at the other end thereof. The bellows 20 is adapted to contract upon the removal of fluid from the tank 10 in response to the reduction in pressure in the pipe 16 as the fluid begins to flow therethrough, and to expand upon the termination of the removal of fluid from the tank. The rack 36, rigidly attached to the bellows 20, is thus adapted to be moved backwards and forwards in a horizontal plane as such bellows contracts and expands. Accordingly, the bellows and rack 36 may be construed as means responsive to the usage of fluid taken from the container 10.

A pinion 38 is rotatably mounted upon the driven shaft 24 in a plane substantially vertical to the rack 36 and is adapted to cooperate with the rack 36 so as to operate the control mechanism 22 in response to the movements of such rack. A pawl 40 is rotatably mounted upon a side of the pinion 38 so as to cooperate with a ratchet 42 rigidly attached to the driven shaft 24 so as to rotate therewith. Accordingly, due to the cooperation of pinion 38 with rack 36, it follows that upon the contraction of the bellows 20 and the movement of the rack 36 towards the left, the pinion 38 will be rotated in a clockwise direction. The pawl 40 will thus engage or lock with the ratchet 42 and cause the driven shaft 24 to be likewise rotated in a clockwise direction.

A second ratchet wheel 44 is rigidly attached to the driven shaft 24 intermediate the ends thereof and has associated therewith a stationarily mounted pawl 46 which cooperates with the ratchet wheel 44 to prevent the driven shaft 24 from rotating in a counter-clockwise direction. It, therefore, follows that as the bellows 20 expands so as to move the rack 36 toward the right, the pinion 38 will rotate in a counter-clockwise direction. However, the cooperation of ratchet wheel 44 and pawl 46 prevents the driven shaft 24 from rotating in such a direction. Accordingly, the pinion 38 will rotate upon the stationary driven shaft 24 as the pawl 40 and pinion 38 move about the stationary ratchet 42.

The following shaft 28 is mounted, in this instance, coaxially with the driven shaft 24 by means of supporting bearings (not shown). Such shaft 28 is operatively associated with the driven shaft by means of the resilient member 32 which is, in this instance, an elongated spirally wound spring. The resilient member 32 is rigidly attached at one end to the driven shaft 24 and at the other end to the following shaft 28. Accordingly, as the driven shaft 24 moves in a clockwise direction, the resilient member 32 biases the following shaft 28 in a clockwise direction. However, the shaft 28 is prevented from rotating and following the shaft 24 with the same velocity because of the cooperative escapement mechanism 34, of the well known self-starting type, although the escapement mechanism permits the following shaft 28 to rotate at a given predetermined velocity as hereinafter described.

The escapement mechanism 34 comprises, in this instance, a well known combination of hairspring, pallet and ratchet wheel. However, it is to be understood that any other suitable device which would limit the rotational velocity of the following shaft 28 may be used in lieu thereof.

A transmission mechanism 54 is operatively associated with the free end of the following shaft 28 and cooperates with the escapement mechanism 34. The transmission mechanism 54 includes a plurality of adjustably positioned pinions or clutching device 55 which cooperates with a plurality of various sized gears 57, which are rigidly attached to following shaft 28. The clutching device 55 may be shifted from one position to another to selectively limit the rotating velocity of the following shaft 28 through the cooperation of the escapement mechanism 34 in a well known manner.

The driven contact 26 is attached to the driven shaft 24 by means of an arm 56 and collector ring 58. The collector ring 58 is a metallic sleevelike member which is positioned about and insulated from the shaft 24. The ring has rigidly attached thereto the radially extending arm 56 whereby the arm 56 will rotate with the driven shaft 24. The arm 56 extends radially from the collector ring and driven shaft 24 and is bent so as to be parallel to the axis of such shafts, toward the following shaft 28. The contact 26 is rigidly attached to the free end of such arm whereby such contact is radially displaced from the axis of the driven shaft 24 and is located substantially in a plane normal to but passing through the resilient member 32. A suitable conductor finger 60 cooperates with the collector ring 58 to convey current from the contact 26, arm 56 and ring 58, to, say, the heating element 12, as hereinafter described.

The cooperating contact 30 is rotatively mounted upon the following shaft 28 by means of a metallic arm 62 rigidly secured to a ratchet wheel 52.

The ratchet wheel 52 is, in this instance, rotatively mounted upon the following shaft 28 near the end thereof, adjacent the resilient member 32, being suitably insulated from shaft 28. An arm 62 is, in this instance, rigidly attached to the wheel 52 and extends a short distance radially therefrom whereupon it is bent towards the driven shaft 24 in a plane substantially parallel to the axis of the shafts so as to be in line with the other contact arm 56. The contact 30 is rigidly attached to the end of the arm 62 and is thus adapted to cooperate with the contact 26.

A pawl carrying arm 48 is rigidly attached to the following shaft 28, say, intermediate the wheel 52 and the resilient member 32, and carries a rotatably mounted pawl 50, preferably of an insulating material, upon the upper end thereof. The pawl 50 cooperates with the ratchet wheel 52 so as to rotate the wheel 52 in a clockwise direction with the following shaft 28 as the latter is rotated by means of the biasing action of resilient member 32. However, it follows that the wheel 52, arm 62 and contact 30 may, under certain circumstances, be rotated in a clockwise direction without causing the rotation of shaft 28, as hereinafter described. A suitable conductor finger 64 cooperates with the ratchet wheel 52 so as to convey current through the ratchet wheel 52 and arm 62, to the contact 30.

The heating element 12 is connected to a suitable source of power by means of supply circuit 29, at one end by lead line 31, finger 64, ratchet wheel 52, arm 62 and contact 30 to cooperating contact 26, arm 56, collector ring 58, finger 60 and line 33, and at the other end by thermostat 14 and lead line 35.

A suitable piece of insulating material 66 is rigidly attached to say the left side of the contact 30 to prevent electrical cooperation between the contacts 26 and 30 when the contact 26 is rotated substantially 360° with respect to contact 30 as hereinafter described.

The operation of the control system embodying my invention may be set forth as follows: Assuming that no fluid is being withdrawn from the tank 10, the bellows 20 will be filled with water and be disposed in an expanded position with the contacts 26 and 30 being engaged, as illustrated. Then upon a withdrawal of fluid from the tank 10, through say the spigot 18, the pressure in pipe 16, tank 10 and bellows 20 will be substantially reduced, whereupon the bellows 20 contacts and rack 36 will be moved to the left, causing the driven shaft 24 to be rotated in a clockwise direction by means of pinion 38 and of cooperating ratchet 42 and pawl 40 (in the locked position). The contact 26 will then be separated from the contact 30, thus disconnecting the heating element 12 from the supply circuit. Upon this rotation of the driven shaft 24 for a small distance, a rotating biasing action will be set up within the resilient member 32 so as to cause the following shaft 28 to follow the driven shaft 24. However, the escapement mechanism 34 associated therewith, through transmission mechanism 54, will prevent the shaft 28 from immediately proceeding to the driven shaft's angular position.

Assuming that the spigot 18 is then closed, causing the fluid pressure in pipe 16, tank 10 and bellows 20 to be increased, bellows 20 will expand, returning the rack 36 to its normal position. However, due to the cooperation of ratchet wheel 44 and pawl 46, shaft 24 is not rotated, but the pinion 38 will rotate about the shaft 24 by reason of pawl 40 slipping over the teeth of ratchet 42.

It follows, therefore, that with repeated withdrawals of fluid from the tank 10, the bellows 20 will oscillate the rack 36 back and forth in response to such withdrawals. The driven shaft 24 will thus be intermittently rotated in a clockwise direction, causing the contactor 26 to be increasingly separated from the contactor 30. The heating element 12 is thus rendered ineffective for a predetermined period proportionate to the usage.

Should the driven shaft 24 be rotated substantially 360° with respect to the following shaft 28, the contact 26 will engage the insulating member 66 located upon the back of contact 30. Upon continued rotation of the driven shaft 24 in a clockwise direction, the contact 26 will force the contact 30 in a clockwise direction. The clockwise movement of contact 30 with respect to following shaft 28 is permitted due to the slipping of pawl 50 over the teeth of ratchet wheel 52. However, this action in no way harms the effective operation of the device or system embodying my invention. The rotation of contact 30 and ratchet wheel 52 with respect to the shaft has no other effect except to limit the time of reenergization of heating element 12 after the last fluid usage.

Assuming that the fluid container 10 is a domestic hot water tank and that spigot 18 represents the various hot water outlets throughout the dwelling-house or the like, it follows that if hot water is withdrawn from any one of such outlets, the contact 26 will be disengaged from the contact 30. Accordingly, the water tank heating element 12 will be disconnected from the supply circuit 29 during the times of water usage or after each such usage, namely, during the daytime and early evening hours, in particular. Inasmuch as the normal hot water usage is during such period, it is apparent that the water tank heater will not be permitted to become energized and will not draw any power from the supply circuit 29 during such period unless under some unusual circumstances, such as when the people of the house are on vacation. At such times the only power needed is that which is required to maintain the tank at its predetermined maximum or desired temperature value.

During the late evening and early morning hours when there is little, if any, hot water usage, the driven shaft 24 and contact 26 remain in a stationary position. However, the escapement mechanism 34 through the transmission mechanism 54, permits the resilient member 32, if under torsional stress by reason of the above-mentioned operations, to rotate the following shaft 28 in a clockwise direction. This rotative action of the following shaft 28 causes the contact 30 to be likewise moved in a clockwise direction, so as to eventually reengage with the contact 26. The length of time of the clockwise rotation of the contactor 30 and following shaft 28 before the reengagement of such cooperating contacts may be predeterminedly adjusted by means of the clutching device 55 of transmission mechanism 54. Accordingly, the length of time after the maximum water usage before the water tank heater will be reconnected to the supply circuit may be readily adjusted to any predetermined time limit, depending upon the relative gear ratios of the transmission mechanism 54.

It therefore follows that the control system embodying my invention may be classified as a domestic water heating control system which will prevent the water heater from being connected to a power supply during the daytime, except when there is no, or very little, hot water usage.

It is to be understood that the size of the tank 10 and the heating ability of heating element 12 will be such that the temperature of the fluid retained within the tank or container 10 will be raised to the desired value during the nighttime or periods of no, or very little, water usage. Further, that the size of tank 10 is such that it will retain and supply the wants of the daytime usage of hot water.

If it be desired, a modified form of water usage responsive device which is directly responsive to volume of fluid taken from the tank 10 may be used in lieu of the bellows 20 and rack 36. Referring to Fig. 2, I show such a modified form of usage responsive means which, in this instance, is a flow meter 68, adapted to operate in direct response to the volume of water or fluid passing through the outlet pipe 16'. A rotatable shaft 70 having a worm 72 associated therewith, is operated by a flow meter 68 of any well known form, in a continuous manner in direct proportion to the volume of water or fluid passing through the outlet pipe 16'. The worm 72 is directly associated with a worm wheel or gear 74. The worm gear 74 is adapted to replace the pinion 38 which is associated with the bellows 20 and rack 36 as hereinabove described. The worm gear 74 is, however, rigidly attached to the driven shaft 24 of the control mechanism hereinabove described and rotates at all times in the correct direction. Accordingly, the driven shaft 24 of control mechanism 22, when the flow meter type of actuating device is associated therewith, is rotated in direct proportion to the volume of fluid or water passing through the tank 10.

It is, therefore, obvious that the operation of the control mechanism 22, when having the flow meter associated therewith, is substantially as hereinabove described when using the bellows 20 and rack 36, except that driven shaft 24 will be rotated with a velocity proportionate to the volume of water passing through the tank.

It is obvious that the liquid flow meter 68 may be readily replaced by a watthour-meter type of actuating device which would drive the driven shaft 24 in response to the amount of electric energy supplied by a battery. Further, the meter 68 may be replaced by a coil-operated machine of a familiar type which would permit the shaft 24 to be rotated a given distance for every coin of a predetermined value. Accordingly, it is obvious that the control system may be used in many other applications, such as air beacon storage battery chargers, coin-controlled heaters, meters, or the like.

If it be desired, a preferably vertically disposed following shaft 28' may be journalled within the end of a preferably vertically disposed driven shaft 24' so as to permit the driven shaft 24' to support, and to permit free rotative movement between, the two shafts (see Fig. 3). With such mounting of the shafts 24' and 28', a resilient member 32' joining such shafts should be flat spirally wound with one end thereof attached to the following shaft 28' and the other end thereof cooperatively attached to the driven shaft 24'. For example, a cup-shaped member 76 may be rigidly attached to the end of the driven shaft 24' and may have rigidly attached to the inner surface thereof, an end of the resilient member 32'.

In addition to this feature, the escapement mechanism 34, transmission mechanism 54, ratchet wheel 52, arm 48, pawl 50 and contact 30 are associated with the following shaft 28' as hereinabove described in connection with shaft 28'. Likewise the contact 26, arm 56 and ring 58 are also associated with the driven shaft 24' as hereinabove described in connection with shaft 24. Further, the two contacts 26 and 30 cooperate to permit energization of, or to deenergize the fluid heater as hereinabove described.

It is, therefore, obvious that I have provided a fluid or water heater control system embodying a fluid tank having a heating element therein, and means responsive to the usage of fluid for rendering the heater inoperative for a predetermined period after fluid usage, and escapement means responsive to the passage of time permitting the reenergization of the heating element after a predetermined period following the last water usage.

Various other modifications may be made in the system and apparatus embodying my invention without departing from the spirit and scope thereof, and I desire, therefore, that only such limitations shall be placed thereon as are imposed by the prior art and the appended claims.

I claim as my invention:

1. In a fluid heating system, the combination with a container for the fluid, and controllable means other than the fluid for imparting heat to said contained fluid, of means other than the fluid responsive to the mere removal of such fluid from the container for rendering the heat-imparting means ineffective for a predetermined period proportionate to the number of removals after the initiation of such removal.

2. In a fluid-heating system, the combination with a container for the fluid, and controllable means other than the fluid for imparting heat to such contained fluid, of a discharge valve, fluid-pressure means responsive to the discharging operation of said valve for rendering the heat-imparting means ineffective, and second means responsive to the passage of time for rendering the heat imparting means effective after a predetermined period for a given usage of the fluid.

3. In a fluid heating system, the combination with a container for the fluid, and controllable means other than the fluid for imparting heat to such contained fluid, of a discharge valve, fluid-pressure means responsive to the discharging operation of said valve for rendering the heat-imparting means ineffective, and second means comprising an escapement mechanism for rendering the heat-imparting means effective after a predetermined period for a given quantity of fluid taken from the container.

4. In a fluid heating system, the combination with a container for the fluid, and controllable means for imparting heat to such contained fluid, of first means responsive to the mere removal of fluid from the container for rendering the heat-imparting means ineffective, and of second means responsive to the passage of time for rendering the heat-imparting means effective after a predetermined period of time from the initiation of removal of fluid from the container.

5. In a fluid heating system, the combination with a container for the fluid, and controllable means for imparting heat to such contained fluid, of a bellows associated with and adapted to expand and contract in response to changes in pressure of the fluid within the container, a driven shaft adapted to rotate in a single direction in response to the movements of the bellows, a movable contact adapted to rotate with such shaft, a following shaft, a resilient member joining the two shafts adapted to rotatively bias and rotate the following shaft in response to the rotative movements of the driven shaft, a second contact adapted to rotate with the following shaft and to cooperate with the first contact for energizing the controllable means, and means responsive to the passage of time for limiting the rotation of the following shaft and the cooperation of the contacts to prevent the heat-imparting means from being energized for a predetermined passage of time after the operation of the bellows and driven shaft.

6. In a fluid heating system, the combination with a container for the fluid, and controllable means for imparting heat to such fluid, of a unidirectional rotating device adapted to rotate in response to the quantity of fluid removed from the container, means in response to the movements of the device for rendering the heat-imparting means ineffective, and second means responsive to the passage of time for rendering the heat-imparting means effective after a predetermined period for a given quantity of fluid taken from the container.

7. In a fluid heating system, the combination with a container for the fluid, and controllable means for imparting heat to such fluid, of a driven shaft, first means responsive to the usage of the fluid for rotating the shaft, a following shaft journalled within the driven shaft, a resilient member joining the two shafts adapted to rotatively bias and rotate the following shaft in response to the movements of the driven shaft, a first contact adapted to rotate with the driven shaft, a second contact adapted to rotate with the following shaft and to cooperate with the first contact to permit energization of the heat-imparting means, and means responsive to the passage of time for limiting the rotation of the following shaft and the cooperation of the contacts after the rotation of the driven shaft to prevent the heat-imparting means from being energized for a predetermined passage of time after a usage of the fluid.

8. In an energy-storage system, an energy-retaining device, controllable means for imparting energy to such device, control means for said controllable means organized to operate to a degree measured by a withdrawal of energy from said device and to render said energy-imparting means inoperative upon the initiation of such energy withdrawal, and means dependent upon the passage of time for gradually nullifying said degree to subsequently render said controllable means operative.

RALPH E. MARBURY.